UNITED STATES PATENT OFFICE
PTO – BOYERS, PA DUTY STATION

---

PAGE NOT AVAILABLE

PATENT NUMBER X 8595 FOR THE ISSUE DATE 1 / 16 / 1835 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing All drawings

DATA CONVERSION OPERATION
BOYERS, PA

Jan. 16, 1835 Jan. 16. 1835 8595X 269.

Henry Gordon. of Fountain Dale, Penn a.

Letters Patent

The Schedule referred to in these Letters Patent, and making part of the same containing a description in the words of the said Henry Gordon, himself, of his improvement in the machine for extracting Stumps. trees &c.

---

To all to whom these presents shall come - Be it known that I Henry Gordon, of Fountain Dale in the County of Adams and State of Pennsylvania, have invented a new and useful improvement in the Stump extractor. for drawing up Stumps, trees &c. and that the following is a full and exact description of the construction & operation of the said Machine, as invented or improved by me - Two planks are to be secured together at their ends, by interposing at each, a piece of timber of from two to five inches thick, by about a foot or more in length, so as to leave a space or opening between these planks of from six to eight feet in length, their thickness will be about two inches, one of them will also have an opening or groove of about three inches in width, extending the whole length of the first described opening, and along the middle of the plank (which will be about a foot wide.) -

That portion left on each side of this opening, is to be perforated by pin holes passing through it, and the plank behind it, and they will be placed alternately - In the opening first described, is to play the end of a lever extending from the stump or tree to be extracted. This end has a strong iron hook or staple, fixed into it, which fastens into another on the end of a lever working in the same opening on the opposite side: and that end operating on the stump, rests upon it passing a little over. It is secured to it by means of hooks or dogs descending from that part of the lever immediately over the side of the stump nearest the end operated on by the other lever, which dogs may be either driven into the stump, or hooked to a chain passed round it for extraction - Should the tree or stump be small, this will be power sufficient, but should more be required, I use another pair of planks secured together at their ends in the same manner, but without the second described opening or groove, and having the holes somewhat nearer

5595X together, and the length of the planks somewhat longer - By this second arrangement, another lever may be applied, which will be hooked on as in the first instance, where the hand would be otherwise be employed, but where this will be necessary, I use a double, instead of a single lever, hooking into the stump lever; the end of which is in that case to work in the second described opening or groove. The double lever will have the hook in the centre & the second pair of planks & apparatus thereto attached, adjusted at each end. Should the power be still required to be increased, the end of the lever working in the second pair of planks may be operated on by the two swords usually employed in the common cider mill. Such is the construction of my machine, the operation is as follows - My first described pair of planks is to be set up in a perpendicular direction, and the stump lever properly secured to the stump either by the dogs or the chain, having the end resting on the stump, in which case it will be rolled out - or resting on a trestle or blocks and in which case it will be drawn out - the end having the staple or hook is passed on to the opening in the upright planks, where it is fastened to the hook of the second lever to be operated on by the hand. This second lever is supported at the necessary height by a pin passing through the holes already described, and which forms the fulcrum or pivot on which it moves by depressing the other end by hand, the stump lever is raised, till by the power communicated thro' the dogs or chain the stump rolls over, or is raised, either without, or with the use of a trestle - - -

Should more power be required, I change my process, and bring the end of the stump lever into the second described groove; where it is fastened to the hook on the double lever, and a pin applied through the holes on one side, that end being opposite, is now raised, and a pin inserted beneath it. the power is now applied on the other end, and another pin inserted and so on, till the stump is extracted - To the ends of my double lever I apply my second pair of planks another lever being there hooked on, in the first described opening and a pin applied beneath it, as often as required to mend the purchase - To the end of this lever the double swords may be applied - -

In order to extract a tree by the roots I use the following process - a notch is cut in the tree on the opposite side to the machine presenting a horizontal surface on which to rest a small square stud, having the ends somewhat rounded. these ends project enough from --- the sides of the tree to admit of a lever to rest on each, having a notch or groove cut in the end of each lever for the purpose of drawing the stud close against the tree; the opposite ends are connected together firmly, & terminate in the hook above described. On these levers rest another small square stud, applied close to the tree, on the opposite side to the one already described and these levers having pins projecting along their length receive other shorter levers with holes made to correspond with the pins, which prevents slipping. These shorter levers bear against the small square stud last mentioned, and consequently when the stump lever is raised, force the tree down. Or to raise the tree, I use a trestle on which to apply the ends of the stump levers - and in that case secure them to the tree either by boring a hole through it & driving a bolt into it or by adjusting the dogs & chain -

What I claim as my own invention, & not previously known in the above described machine is the manner in which I combine the leverage from the first described pair of planks, & continue it to the stump or tree to be extracted as above described - In testimony that the above is a full and exact description of the construction & use of my machine as above described, I have hereunto set my hand this fifth day of January in the year eighteen hundred & thirty-five -

Witnesses
Robt. Clarke
Henry Stone

Henry Gordon

1260 [illegible]

Exd
[illegible]